US012793576B2

(12) United States Patent
Haval et al.

(10) Patent No.: US 12,793,576 B2
(45) Date of Patent: Nov. 10, 2026

(54) SYSTEM FOR SIMULATION TRAINING OF EXTRA CORPOREAL LIFE SUPPORT THERAPIES

(71) Applicants: Sagar S. Haval, Coalville (GB); Babita S. Haval, Coalville (GB)

(72) Inventors: Sagar S. Haval, Coalville (GB); Babita S. Haval, Coalville (GB)

( * ) Notice: Subject to any disclaimer, the term of this patent is extended or adjusted under 35 U.S.C. 154(b) by 1133 days.

(21) Appl. No.: 17/543,137

(22) Filed: Dec. 6, 2021

(65) Prior Publication Data

US 2022/0108631 A1 Apr. 7, 2022

Related U.S. Application Data

(63) Continuation of application No. PCT/IB2020/055068, filed on May 28, 2020.

(30) Foreign Application Priority Data

Feb. 6, 2020 (GB) ..................................... 2001596

(51) Int. Cl.
*G09B 23/28* (2006.01)

(52) U.S. Cl.
CPC ......... *G09B 23/286* (2013.01); *G09B 23/285* (2013.01); *G09B 23/288* (2013.01)

(58) Field of Classification Search
CPC .. G09B 23/286; G09B 23/285; G09B 23/288; G09B 23/303; G09B 23/32; G09B 23/28; G09B 23/30

(Continued)

(56) References Cited

U.S. PATENT DOCUMENTS 4,974,461 A * 12/1990 Smith .................. G09B 23/286 73/865.6
8,678,832 B2 3/2014 Eggert et al.
(Continued)

FOREIGN PATENT DOCUMENTS

KR 101675974 B1 11/2016
WO 2015187616 A1 12/2015

OTHER PUBLICATIONS

International Search Report and Written Opinion for Application No. PCT/IB2020/055068 dated Aug. 12, 2020 (9 pages).
(Continued)

*Primary Examiner* — Gautam Ubale
*Assistant Examiner* — Stephen Alvesteffer

(57) ABSTRACT

A system for simulation training of extra corporeal life support therapies comprises a patient mannequin with torso and head, and includes a plurality of sensors configured for sensing pre-determined parameters during the simulation training scenarios. An internal tank reservoir is configured to act like a fluid reservoir to help in seamless air free circulation of fluid for simulation. An external perfusion simulator is configured to fill fluid into the internal tank reservoir. A plurality of fluid pumps is configured to prime the system and create pulsations during simulation of various clinical scenarios. A plurality of electrically controlled solenoid valves is configured to direct the fluid flow and create resistance. The system includes a plurality of silicone mixture molds embedded on or inside the torso to perform realistic ultrasound guided vessel cannulation and a plurality of connectors to connect the internal tank reservoir to the external perfusion simulator.

11 Claims, 2 Drawing Sheets

(58) Field of Classification Search
USPC .......................................................... 434/270
See application file for complete search history.

(56) References Cited

U.S. PATENT DOCUMENTS

| | | | | |
|---|---|---|---|---|
| 9,342,996 | B2 | 5/2016 | King | |
| 2014/0272878 | A1* | 9/2014 | Shim ........................ | G09B 9/00 434/272 |
| 2018/0301062 | A1 | 10/2018 | Curtis | |
| 2018/0366033 | A1* | 12/2018 | Buckman ............. | G09B 23/303 |

OTHER PUBLICATIONS

GB Search Report and Examination Report dated Jul. 22, 2020 of GB Application No. GB2001596.2 (32 pages).

* cited by examiner

SYSTEM FOR SIMULATION TRAINING OF EXTRA CORPOREAL LIFE SUPPORT THERAPIES

CROSS-REFERENCE TO RELATED PATENT APPLICATIONS

This patent application is a continuation of International Application No. PCT/IB2020/055068, filed on May 28, 2020, which claims the benefit of priority to United Kingdom Patent Application No. 2001596.2, filed Feb. 6, 2020, the entire teachings and disclosures of both applications are incorporated herein by reference thereto.

FIELD OF INVENTION

The embodiment herein generally relates to medical training, and more particularly but not exclusively, to training performed for extracorporeal support techniques such as extracorporeal membrane oxygenation (ECMO) or Extracorporeal Carbon Di oxide removal (ECCO2R) or Extracorporeal cardio-pulmonary resuscitation (ECPR) or Dialysis.

BACKGROUND AND PRIOR ART

Medical simulation has existed since many decades, and it has been very helpful in enhancing clinical practices and hence enhancing patient outcomes.

Clinicians have been doing simulation using solutions ranging from low cost in-house solutions to high-end high-fidelity patient simulators.

There is a rise of the need and the use of Simulation trainings in the field of Extra Corporeal circulation systems especially in the field of Extra Corporeal Life Support systems like ECMO (Extra Corporeal Membrane Oxygenation) and ECLS (Extra Corporeal Life Support).

Life support systems like Extracorporeal membrane oxygenation (ECMO) is widely used in patients experiencing respiratory and/or cardiac failure who are unresponsive to conventional treatment. Healthcare staffs that provide ECMO treatment are expected to make a speedy and appropriate response to relevant emergencies; however, successful management of ECMO emergencies remains challenging due to the use of highly complex therapies in critical settings.

ECMO emergencies place great stress on healthcare staff, which may lead to medical errors that directly influence patient outcomes.

Conventional trainings for instance related to extracorporeal membrane oxygenation (ECMO) training usually only consists of didactic lectures and water drill of ECMO circuit. However, learners cannot "experience" changes of clinical condition of patients. Simulation-based learning is a perfect answer to this by providing participants authentic, interactive, team-based training without risk to real patients.

Clinicians have been doing ECMO/ECLS simulations using their in-house manikins implementing frugal techniques to simulate real life patient scenarios and therapy supports.

Unfortunately there is no good all in one ECMO/ECLS simulator which can be used for most of the important aspects of ECC/ECMO/ECLS simulations which includes all peripheral vessel cannulation, controlled arterial pulsations and arrhythmias and, intubation and ventilation, blood like fluid color changes in veins and arterial vessels, Intra-Aortic Balloon Pumping (IABP) compatible, ability to connect to the external perfusion simulator, wireless simulate various clinical scenarios during cannulation and therapy support simulations, used for dialysis simulations, central venous catheterization simulations.

Therefore, there is a need to develop a system for simulation training of extra corporeal life support therapies which can be used for realistic simulations of various types and configurations of Extra Corporeal life supports.

The claimed subject matter is not limited to embodiments that solve any disadvantages or that operate only in environments such as those mentioned herein. Rather this background is only provided to illustrate examples of where the present disclosure may be utilized.

OBJECTS OF THE INVENTION

Some of the objects of the present disclosure are described herein below:

A main object of the present invention is to provide a system for simulation training of extra corporeal life support therapies which can be used for realistic simulations of various types and configurations of Extra Corporeal life supports.

Another object of the present invention is to provide a system for simulation training of extra corporeal life support therapies like ECMO (Extra Corporeal Membrane Simulation), ECLS, (Extra Corporeal Life Support) ECCO2R (Extra Corporeal Carbon dioxide removal), ECC (Extra Corporeal Circulation), Dialysis and Cardio-Pulmonary Bypass.

Still another object of the present invention is to provide a system which includes intubation, femoral vessel cannulation, neck vessel cannulation, ultrasound guided cannulation and visualization, various ECC case scenario generation, wireless controls for scenario generation.

Yet another object of the present invention is to provide a system which is smart and can be used for generating clinical scenarios using voice virtual assistants available on a mobile device.

Another object of the present invention is to provide a system which has features that can be controlled using a mobile application.

Another object of the present invention is to provide a system that can create realistic color change of the circulating fluid which can mimic venous and arterial blood in different clinical conditions.

Another object of the present invention is to provide a system that can simulate cardiac arrhythmias with changes in pulsations on the femoral arteries or carotid artery for simulating various cardiac conditions needing extracorporeal support.

Another object of the present invention is to provide a system that can be used to simulate Intra-Aortic Balloon Pump support therapy.

Another object of the present invention is to provide a system that includes an Ultraviolet Lamp to disinfect and help prevent any microbial growth inside the mannequin Another object of the present invention is to provide a system that can create different lung failure scenarios to regulate resistance during ventilation.

Another object of the present invention is to provide a system that has an ability to perform a Trans-Oesophageal Echocardiography.

Another object of the present invention is to provide a system thatcan be used for Double-Lumen Cannulation for Veno-Venous ECMO/ECCO2R.

The other objects and advantages of the present invention will be apparent from the following description when read in conjunction with the accompanying drawings, which are incorporated for illustration of preferred embodiments of the present invention and are not intended to limit the scope thereof.

SUMMARY OF THE INVENTION

In view of the foregoing, an embodiment herein provides a system for simulation training of extra corporeal life support therapies, wherein the system comprises a mannequin 212, plurality of sensors 201-203, an internal tank reservoir 101, an external perfusion simulator 102, a plurality of fluid pumps 104,111, a plurality of electrically controlled solenoid valves 103,110 and a plurality of connectors 124,125.

According to an embodiment, the mannequin 212 in the system for simulation training of extra corporeal life support therapies contains torso and head and is embedded with various synthetic organs, vessels and circuits.

According to an embodiment, the plurality of sensors 201-2-3 of the system is configured for sensing pre-determined parameters during the simulation training scenarios.

The internal tank reservoir 101 of the system may be configured to act like a fluid reservoir to help in seamless air free circulation of fluid for simulation, according to an embodiment.

According to an embodiment, the external perfusion simulator 102 may be configured to fill fluid into the internal tank reservoir 101 and the plurality of fluid pumps 104,111 may be configured to prime the system and create pulsations during simulation of various clinical scenarios.

According to an embodiment, the plurality of electrically controlled solenoid valves 103,110 may be configured to direct the fluid flow and create resistance to generate clinical scenarios for simulation and the plurality of connectors 124,125 to connect the internal tank reservoir 101 to the external perfusion simulator 102.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION OF THE PREFERRED EMBODIMENTS

Figure 1:
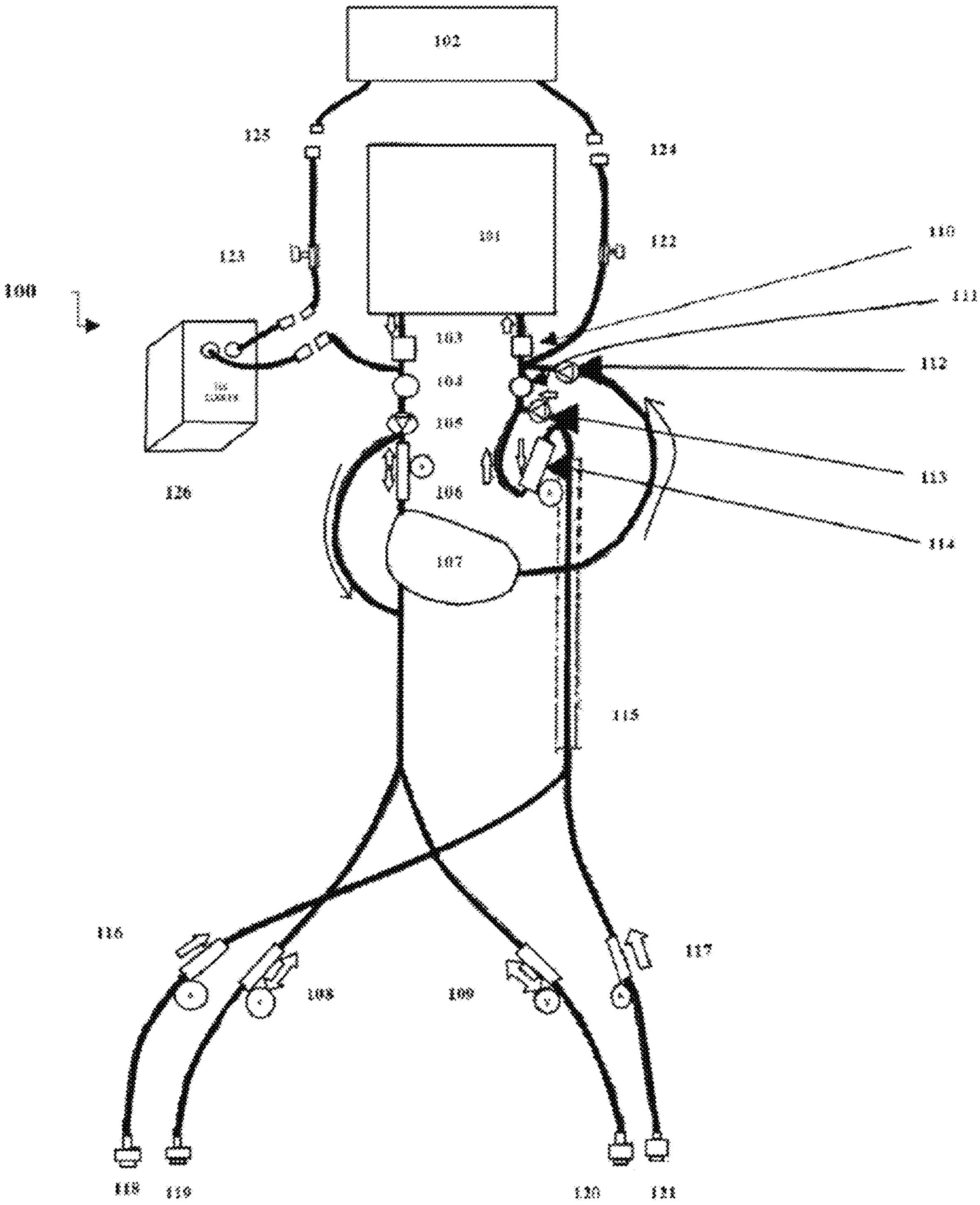
FIG. 1 illustrates a hydraulic circuit diagram 100 of the simulator system of the present invention along with its components, according to an embodiment herein.

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned above, there is a need to develop a system 100 for simulation training of extra corporeal life support therapies which may be used for realistic simulations of various types and configurations of Extra Corporeal life supports.

The invention is designed to be used for simulation training involving various Extracorporeal Circulation support and therapies. The combination of various features makes it a unique solution for basic to advanced level for Extra Corporeal Circulatory (ECC) support Simulations.

The simulator system 100 of the present invention may be used to create simulation scenarios of patient intubation for ventilation, creating different lung failure scenarios by using lung restraints to regulate resistance during ventilation, ultrasound guided vessel catheter or cannula insertion, peripheral vessels like left and right femoral vein, left and right femoral artery, internal jugular vein and carotid artery cannulation.

This invention may be connected to an extra corporeal circulation system to simulate different clinical scenarios like initiation, management and troubleshooting of extra corporeal life support (ECLS) or Extracorporeal Membrane Oxygenation (ECMO) or Extracorporeal Carbon Di Oxide removal (ECCO2R) or Extracorporeal cardio-pulmonary resuscitation (ECPR), Dialysis, any other Extra corporeal circulation system.

This simulator may also be used to simulate insertion, removal of Intra—Aortic balloon catheter and management of Intra-Aortic Balloon pump support therapy.

Extracorporeal membrane oxygenation, also known as extracorporeal life support, is an extracorporeal technique of providing prolonged cardiac and respiratory support to persons whose heart and lungs are unable to provide an adequate amount of gas exchange or perfusion to sustain life. The technology for ECMO is largely derived from cardiopulmonary bypass, which provides shorter-term support with arrested native circulation.

Patients under the error-prone and complication-burdened extracorporeal membrane oxygenation (ECMO) are looked after by a highly trained, multidisciplinary team. Simulation-based training (SBT) affords ECMO centers the opportunity to equip practitioners with the technical dexterity required to manage such emergencies.

ECMO procedures may be associated with a variety of risks and complications such as bleeding, thromboembolism, cannulation-related Heparin-induced thrombocytopenia, veno-arterial complications, pulmonary hemorrhage, cardiac thrombosis, coronary or cerebral hypoxia. Such risks and complications may be reduced or eliminated through training so that the healthcare providers are more readily capable of, inter-alia, identifying potential complications, responding to circumstances to avoid complications, and/or decreasing the effects of complications when they arise.

In Extracorporeal circulation (ECC) blood is taken from a patient's circulation to have a process applied to it before it is returned to the circulation. The apparatus carrying the blood outside the body is called the Extra Corporeal circuit.

Simulation training on this procedure makes it easier for the practitioners to manage such emergencies.

Figure 2:
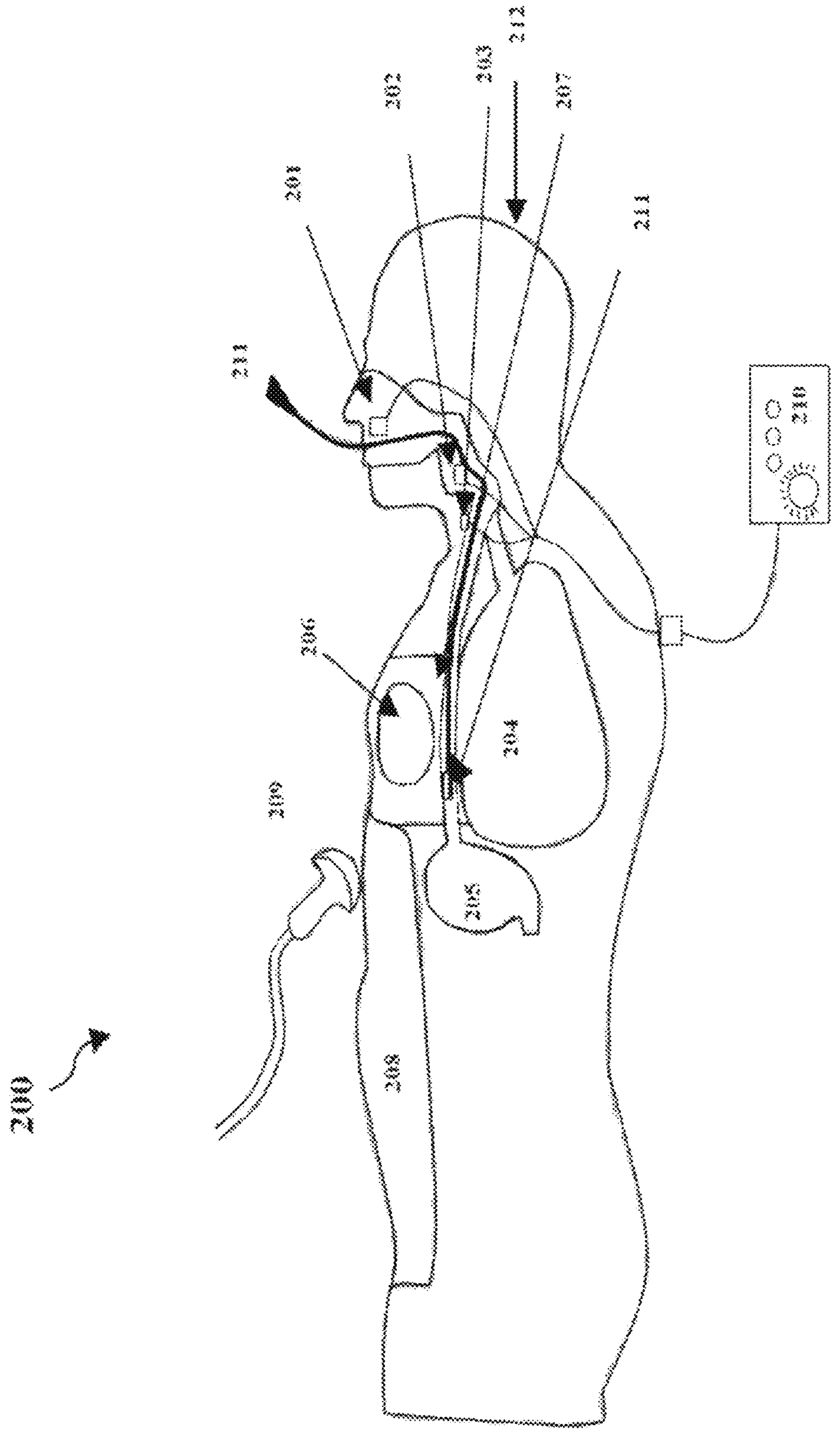
FIG. 2 illustrates a side view 200 of the anatomic components inside the simulator system, according to an embodiment herein.

Referring now to the drawings, and more particularly to FIGS. 1 through 2, where similar reference characters denote corresponding features consistently throughout the figures, there are shown preferred embodiments.

FIG. 1 illustrates a hydraulic circuit of diagram of the simulator system 100 of the present invention, according to an embodiment.

According to an embodiment, the system 100 for simulation training of extra corporeal life support therapies, wherein the system comprises a mannequin 212 with torso and head having various synthetic organs, vessels and circuits embedded into it; a plurality of sensors 201-203 configured for sensing pre-determined parameters during the simulation training scenarios; an internal tank reservoir 101 configured to act like a fluid reservoir to help in seamless air free circulation of fluid for simulation; an external perfusion simulator 102 configured to fill fluid into the internal tank reservoir; a plurality of fluid pumps 104,111 configured to prime the system and create pulsations during simulation of various clinical scenarios; a plurality of electrically controlled solenoid valves 103, 110 configured to direct the fluid flow and create resistance to generate clinical scenarios for simulation; and a plurality of connectors 124, 125 to connect the internal tank reservoir to the external perfusion simulator According to an embodiment, the internal tank reservoir 100 of the circuit 100 functions as an internal fluid reservoir for helping seamless air free circulation of fluid for simulations. This will reduce the need of using external reservoir during the use of the system 100.

According to an embodiment, the external reservoir or the external perfusion simulator 102 fills fluid into the internal reservoir 101 and the internal water/fluid circuit of the cannulation simulator. It may be used as the main backup reservoir when the internal reservoir 101 is not in use. It also may be used when adding coloured fluid used to mimic blood during simulations. The Internal reservoir 101 is not used and the inflow to it is blocked using the electric solenoid valves 103. It may also be connected to the system 100.

According to an embodiment, the electrically controlled solenoid valves 103 of the system 100 help direct the fluid flow to use internal reservoir 101 or external reservoir 102 and create resistance on the venous and or arterial part of the circuit to help create various clinical scenarios like—Hypovolemia, Blocked venous line/cannula, blocked arterial cannula, etc.

According to an embodiment, two DC motor fluid pumps 104, 111 may be used, one each for arterial side of the circuit and one for venous side of circuit. The venous pump may be initially used for priming the internal circuit of the cannulation simulator and later used when fluid assistance is required. The arterial pump may be used initially for priming the system 100 and later may be used to create various types of pulsations like tachycardia, bradycardia, low cardiac output syndrome, high blood pressure, low blood pressure, ventricular fibrillation, atrial fibrillation, bigeminy, trigemini, premature ventricular contractions, etc.

According to an embodiment, the one way valves 105, 112, 113 of the system 100 are used to direct the flow in one direction preventing back flow of fluid inside the internal circuit.

According to an embodiment, the silicone tube vessels 106, 108, 109, 114, 116, 117 for cannulation (Right Internal Jugular Vein, Right Common Carotid Artery, Right and Left Femoral Vein, Right and Left Femoral Artery) are the disposable bits of the circuit which are used as vessels (arteries or veins) for catheterisation/cannulations.

According to an embodiment, the rubber heart 107 of the system 100 helps to fix proper cannulation inside the venous part of the circuit during simulation trainings and also helps identify the direction of fluid flow inside the heart 107 using ultrasound scanner.

According to an embodiment, the silicon tube for large sized aorta 115 helps in Intra-aortic balloon catheter cannulation.

According to an embodiment, the end caps 118-121 of the system are located outside the cannulation mannequin 212 and may be used to stop any water leaking out of the cannulation simulator. The end caps 118-121 may also be used for de-airing the internal circuit when performing the initial priming operation and drain the water out of the simulator system 100 after the use.

According to an embodiment, the plastic stop cocks 122,123 are plastic taps used to control fluid flow from the external tank/simulator inside the cannulation simulator system 100.

According to an embodiment, the plastic quick coupling connectors (male and female) 124, 125 may be used to connect the external reservoir or external perfusion simulator 102/or the Thermo-Electric Cooler (TEC) to the cannulation simulator system 100.

According to an embodiment, a wireless pulse controller switch used in conjunction with the Pulse Controller remote controller or mobile app connected via WIFI may be used to simulate various haemodynamic and or cardiac scenarios like systole, tachycardia, bradycardia, low cardiac output syndrome, high blood pressure, low blood pressure, ventricular fibrillation, atrial fibrillation, bigeminy, trigemini, and premature ventricular contractions.

According to an embodiment, a wireless devices controller switch provides electricity to the electric/electronic devices inside the cannulation simulator system like the fluid pumps and the electrically controlled solenoid valves. The devices connected to this switch may also be controlled using a RF remote control or a mobile app or voice commands.

According to an embodiment, a waterproof ultraviolet lamp may also be used intermittently in the system 100 to prevent and/or treat any bacterial and/or fungal contamination and/or growth inside the cannulation simulator. It may be placed inside the simulator system which will not be visible to the naked eye during operation.

According to an embodiment, a wall plug may be used for supplying power to the system.

According to an embodiment, an electric transformer may be used in the system 100 to supply power to the electrical parts of the system 100.

According to an embodiment, the internal tank reservoir 101 designed to be used to perform extracorporeal circulation and cannulation simulations independent of an external reservoir 102. The Internal tank reservoir 101 may be used in almost all the type of simulations. The electrically controlled solenoid valves 103,110 may limit fluid to enter the internal reservoir; this may be mainly helpful when the user wants to only use the external reservoir with the colored fluid during simulations.

According to an embodiment, priming and use of the simulator system may be performed using only clear tap water and colored mixture fluid. Initially the external reservoir 102 may be filled with tap water and connected to the quick-coupling connectors 124,125 located on the two external arterial and venous limbs of the cannulation simulator.

The stop-cock taps 122,123 are opened, and passive priming of the internal circuit may be performed. The Electrically controlled solenoid valves 103,110 may be kept open and the internal reservoir 101 may be filled with water. The four end caps 118-121 located underside both the legs are partially opened one by one to release air inside the circuit. The Venous Pump may be started to actively prime the circuit and de-air the internal circuit. The remaining air inside the circuit is expelled inside the external reservoir 102. After confirmation of proper de-airing of the vessels and internal circuitry, the external reservoir 102 may be closed using the stop-cock taps 122,123 and the internal reservoir 101 may be used to perform simulations. The external reservoir 102 may be kept open depending on the user preference.

According to an embodiment, the Arterial pump may be switched on and pulsations may be defined using the pulse controller remote control. The arterial pulsations may be checked by feeling the femoral arteries 116,117 and carotid artery 114.

According to an embodiment, for priming using colored mixture fluid for mimicking blood initially an external reservoir 102 may be filled with mixture of tap water, black thermochromic dye (activating temperature 37 degree C.) and Bright red colour and connected to the quick-coupling connectors 124,125 located on the two external arterial and venous limbs of the cannulation simulator. The Thermo-Electric Cooler (TEC) 126 is connected on the outflow line of the external reservoir using the quick couplings. The electrical solenoid valves 102,110 may be kept closed to prevent any fluid entering the internal reservoir 101. If the user wants the internal tank 101 may also be used by keeping the solenoid valves open. The stop-cock taps 122,123 may be opened, and passive priming of the internal circuit may be performed. The four end caps 118-121 located underside both the legs may be partially opened one by one to release air inside the circuit. The Venous Pump may be started to actively prime the circuit and de-air the internal circuit. During operation of the simulator during performing simulations the TEC 126 may be switched on to actively cool the fluid entering the simulator from the external reservoir 102 to show a color change of fluid from bright red to dark brown-red colour.

According to an embodiment, for priming and using colored mixture fluid for mimicking blood; initially an external reservoir 102 may be filled with a mixture of tap water, Bright red colour and Blue Photo-Chromic Dye. While using this mixture of coloured fluid, the external reservoir 102 may be used and internal reservoir 101 may be preferably kept closed and not used. The hydraulic circuit may be primed with the coloured mixture fluid and de-aired to prepare for cannulation. For simulating the colour change the Ultra-Violet lamp situated inside the mannequin may be activated to make the blue photochromic colour visible in the fluid mixture of the venous side of the circuit. This makes the blue colour more visible and the red and blue mixture fluid turns to turn dark magenta, which may mimick venous blood during cannulation and Extracorporeal circulation (ECC). After few seconds of exiting the mannequin into the extracorporeal circulation system like ECMO/ECLS/Dialysis/ECCO2R/CPB, the Photochromic dye may turn colourless due to the absence or less exposure of UV light in the room thereby making the fluid bright red again which mimics the colour of blood in the extracorporeal circulation system.

According to an embodiment, the remaining air inside the circuit may be expelled inside the external reservoir 102. After confirmation of proper de-airing of the vessels and internal circuitry, the external reservoir 102 may be closed (except when using the Thermo-Chromic dye solution to mimic blood) using the stop-cock taps and the internal reservoir 101 may be used to perform simulations. The external reservoir 102 may also be kept open depending on the user preference. The Arterial pump may be switched on and pulsations may be defined using the pulse controller remote control. The arterial pulsations may be checked by feeling the femoral arteries 116, 117 and carotid artery 114.

According to an embodiment, after using the cannulation simulator 100, 200 most of the fluid may be drained by draining the fluid into the external reservoir 102 by gravity. Then the four end caps 118-121 placed under the legs of the mannequin 212 may be released and mannequin 212 can be made vertical above sink to drain the rest of the fluid by gravity.

The circuit 100, illustrated in FIG. 1, provides one non-limiting example of an operating environment in which the system disclosed herein may be employed. However, the system may be utilized in other operating environments and/or other configurations of the circuit 100.

FIG. 2 illustrates the side view of the anatomic components inside the simulator system 200, according to an embodiment herein.

According to an embodiment, the patient mannequin 212 comprises the torso with head and is constructed using resin. It comprises internal electric and hydraulic circuit embedded into it. The skin of the mannequin 212 may be constructed using thermoplastic elastomers and/or silicone to create skin like feeling on the hard shell body of the mannequin 212.

According to an embodiment, the plurality of sensors comprises a teeth pressure sensor 201, a tracheal proximity sensor 202 and an oesophageal proximity sensor 203.

According to an embodiment, the teeth pressure sensor 201 helps in the training of lung intubation from the mannequin's 212 mouth. Any increased pressure on the teeth signals the alarm box 210 to sound a visual and audible alarm.

According to an embodiment, the tracheal proximity sensor 202 also helps in the training of lung intubation. The proximity of the endotracheal tube to trachea may signal the alarm box 210 to sound a visual and audible alarm.

According to an embodiment, the oesophageal proximity sensor 203 helps in the training of lung intubation. The proximity of the endotracheal tube to Oesophagus may signal the alarm box 210 to sound a visual and audible alarm.

According to an embodiment, the rubber lung 204 of the system helps in simulation training using a ventilator and the lung resistance kit may help generate various lung resistance scenarios.

According to an embodiment, the rubber stomach 205 may help perform Trans-Oesophageal Echocardiography (TOE) to visualise fluid flow inside the heart during Double-Lumen Venous-Venous cannulations and the practitioners may also know the ET tubes position in Oesophagus.

According to an embodiment, the silicone block for ultrasound 207, 208 may help perform ultrasound scanning of the vessels or the heart for guided cannulation. The blocks may be constructed using 100% silicone or with a mixture of silicone with 23% Vaseline and flour particles to mimic real muscle tissue which may be ultrasound compatible.

According to an embodiment, an Intubation indicator alarm box 210 may help indicate visually and by an audible alarm to the user about the position of the Endo-Tracheal tube during the intubation procedure.

According to an embodiment, the Thermo-Chromic dye turns colorless or to a light colour when heated onto its activating temperature, which in this case is 37 degree centigrade. During heating cycle, the colour fades at approximately 4 degrees centigrade below the activation temperature and may gradually weaken till activation temperature (37 deg C.) is reached. The TEC cooler 126 may help reduce the temperatures of the fluid down to make the black thermochromic colour visible and hence creating a darker blackish-red colour on the venous side of the circuit, which may then mimic venous blood while performing the cannulations.

According to an embodiment, the colour change of the fluid mimicking blood takes place using the Thermo chromic dye and Thermo-Electric cooler (TEC) 126. The fluid may consist of a mixture of tap water, bright red colour and Black Thermo-Chromic Dye (activation temperature of 37 degree C.). While using this mixture of coloured fluid, the external reservoir 102 is used and internal reservoir 101 is preferably kept closed and not used. The hydraulic circuit 100 may be primed with the colored mixture fluid and de-aired to prepare for cannulation. When simulating the color change the Thermo-Electric Cooler 126 is used to cool the temperature of the fluid of the venous side of the circuit 100. This may make the black colour more visible making the red and black mixture fluid to turn dark red, which may mimic venous blood during cannulation and during the Extracorporeal circulation (ECC). Once the fluid warms in the Extracorporeal circulation system like ECMO/ECLS/Dialysis/ECCO2R/CPB, then the thermochromic black dye changes to colourless and bright red colour may be visible in the arterial side of the ECC circuit.

According to an embodiment, for the fluid color change using Photo-Chromic dye and Ultra-Violet lamp; the fluid may consist of a mixture of tap water, bright red color and blue photo chromic dye. When using this mixture of colored fluid, the external reservoir 102 may be used and internal reservoir 101 may preferably be kept closed. The hydraulic circuit is primed with the colored mixture fluid and de-aired to prepare for cannulation. While simulating the color change the Ultra-Violet lamp situated inside the mannequin 212 may be activated to make the blue photochromic colour visible in the fluid mixture of the venous side of the circuit. This may make the blue color more visible making the red-blue mixture fluid to turn dark magenta, which may then mimic venous blood during cannulation and during the Extracorporeal circulation (ECC). After few seconds of exiting the mannequin 212 into the extracorporeal circulation system like ECMO/ECLS/Dialysis/ECCO2R/CPB, the photo-chromic dye may turn colorless due to absence or less exposure of UV light in the room thereby making the fluid turn again to bright red which mimics the color change of blood in the extracorporeal circulation system.

According to an embodiment, a Thermo electric cooler (TEC) 126 located on the venous side of the circuit. The TEC may help lower down the temperature of the colored fluid to help bring darker color to the fluid by making the black thermo-chromic dye more prominent in the bright red color fluid. This is to mimic realistic color change to differentiate the venous and arterial blood color.

According to an embodiment, the electronic and/or electrical devices like Arterial and Venous DC Motor pump 104,111, Arterial and Venous electric solenoid valves 103, 110, Ultra Violet Lamp, Thermo-electric cooler (TEC) 126 and the Arterial Pulse controller may be controlled using an RF remote or using an app on mobile device which may signal the wifi controlled switch. The apps may be individual to the wifi controlled switch provider. All the devices then may be controlled using app and/or using voice commands.

According to an embodiment, for simulation related to the peripheral cannulation a standard open or closed Seldinger's technique may be used to perform peripheral cannulation at right and/or left Femoral sites (Right and/or Left Femoral Artery and/or Veins) and/or right sided Neck Vessels (Right common carotid artery and/or right internal jugular vein).

According to an embodiment, an Ultrasound scanner may be used to identify and guide the peripheral vessels during cannulation for performing peripheral cannulation using ultrasound.

According to an embodiment, a standard open or closed Seldinger's approach may be used to cannulate the internal jugular vein for double-lumen cannulation. Trans-Oesophageal Echocardiography (TEE/TOE) and/or Trans-Thoracic Echocardiography (TTE) may be used to guide proper position of the cannula and scan the direction of the outflow of the cannula inside the heart. Seldinger's approach is the most common method used for the insertion of a central intravenous (IV) line.

According to an embodiment, for the simulation of Intra-Aortic balloon catheter (IABC) placement the standard Seldinger's technique may be used to insert the catheter and positioned according to the anatomical marking on the mannequin 212. A standard usage procedure of the IABC along with an Intra-Aortic Balloon Pump (IABP) may be performed.

According to an embodiment, for performing the Trans-Oesophageal Echocardiography (TEE/TOE) and or Trans-Thoracic Echocardiography (TTE) scanning to visualize the position of the cannula and direction of the outflow of the cannula, the standard Trans-Thoracic Echocardiography (TTE) may be used by placing a ultrasound probe 211 on the chest or upper abdomen of the cannulation simulator mannequin 212 to perform the scanning. Standard Trans-Oesophageal Echocardiography (TEE/TOE) probe 211 may be placed in the oesophagus of the cannulation mannequin 212 (inserted from the mouth) and position to visualize the heart and the position of the cannula.

According to an embodiment, for the simulation of different lung resistance clinical scenarios the resistance may be changed on the lungs during ventilation using a control mechanism which can be accessed from outside the mannequin 212. The lungs may be secured inside the mannequin 212 with resistance-controlled flaps. The more the flap obstructs the lungs during ventilation, the more the airway pressures may be observed on the ventilator.

According to an embodiment, for performing the Endo-Tracheal Intubation and ventilation a standard intubation procedure may be followed, with visualization of vocal cords and separation of oesophagus from trachea using a laryngoscope. The Teeth pressure sensor 201 may signal the alarm box with a visual and audible alarm if the user puts pressure on the teeth during the intubation. The oesophageal 202 and tracheal proximity sensor 203 may signal the alarm box 210 with a visual and audible alarm to confirm the location of the Endo-tracheal tube during the intubation. \

According to an embodiment, the Arterial DC motor pump may be connected to a pulse controller switch which can be remotely controlled using a mobile app or RF remote controller for generating various haemo dynamic or cardiac scenarios. The buttons on the remote controller may guide in using different modes of pump operation. Various hemodynamic and cardiac scenarios may be generated like asystole, Tachycardia, bradycardia, low cardiac output syndrome, high blood pressure, low blood pressure, ventricular fibrillation, atrial fibrillation, bigeminy, trigemini, premature ventricular contractions, etc.

According to an embodiment, the rubber lungs 204 may be secured inside the mannequin 212 with resistance-controlled flaps. The resistance may be changed for creating different lung resistance scenarios on the lungs during ventilation using a control mechanism which may be accessed from outside the mannequin 212. The more the flap obstructs the lungs during ventilation, the more the airway pressures may be visible on the ventilator.

According to an embodiment, the silicone rubber vessels 106,108,109,114,116,117 may be replaced after their use. First the skin may be peeled off from the mannequin 212 body exposing the vessel tubings, the user may need to cut and pull out the tubing bits used as vessels and replace it with new bits of tube. All the peripheral vessels including the Left 117 and Right Femoral Artery 116, Left 109 and Right Femoral Vein 108, Right Common Carotid Artery 114, Right Internal Jugular Vein may be replaced after their use.

A main advantage of the present invention is that the system provides Right and Left Femoral Vein, Right and Left Femoral Artery, Right Internal Jugular Vein and Right Common Carotid Artery for peripheral vessel cannulation.

Another advantage of the present invention is that all vessels of the system are internally connected to allow for realistic simulations of various types and configurations of extra corporeal life supports system.

Still another advantage of the present invention is that the system integrates all the features ideal for performing ECMO/ECLS/ECCO2R/ECC/Dialysis/Cardio-Pulmonary Bypass simulations.

Yet another advantage of the present invention is that the system can be used for simulation of intubation, femoral vessel cannulation, neck vessel cannulation, ultrasound guided cannulation and visualization, various ECC case scenario generation and contains wireless controls for scenario generation.

Another advantage of the present invention is that the system of the present invention is the first smart ECMO/ECLS/ECCO2R/ECC/Dialysis/Cardio-Pulmonary Bypass simulator which can be used for generating clinical scenarios using voice virtual assistants available on a mobile device.

Another advantage of the present invention is that the system can create realistic color change of the circulating fluid which can mimic venous and arterial blood.

Another advantage of the present invention is that the system can simulate cardiac arrhythmias with changes in pulsations on the femoral arteries or carotid artery. This may be helpful to simulate various cardiac conditions needing extracorporeal support.

Another advantage of the present invention is that the system can accommodate an Intra-Aortic Balloon catheter and can be used to simulate Intra-Aortic Balloon Pump support therapy.

Another advantage of the present invention is that the simulator system can create different lung failure scenarios by using lung restraints to regulate resistance during ventilation Another advantage of the present invention is that the system possesses the ability to perform a Trans-Oesophageal Echocardiography.

Another advantage of the present invention is that the system may be used for Double-Lumen Cannulation for Veno-Venous ECMO/ECCO2R. A Trans-Thoracic Echocardiography or Trans Oesophageal Echocardiography may be performed using the simulator system of present invention to help visualize the proper cannulation and confirmation of the position of the cannula by tracking the fluid flow using ultrasound.

Another advantage of the present invention is that the system possesses an Electronic display of alarms for situations during intubation such as increased pressure on tooth by laryngoscope during intubation, Oesophageal intubation and/or tracheal intubation.

Another advantage of the present invention is that the system contains an internal fluid tank to facilitate cannulation and help create clinical scenarios.

Another advantage of the present invention is that the system possesses the ability to create arterial pulse indicating various cardiac abnormalities such as Tachycardia, Bradycardia, Low Cardiac Output Syndrome, Irregular Cardiac Rhythm/arrhythmias, Asystole, Ventricular Fibrillation, Trigeminy, Bigeminy and Premature Ventricular Contractions.

Another advantage of the present invention is that the system may be used along with an external perfusion simulator, by connecting the external tubes to the perfusion simulator.

Another advantage of the present invention is that the system contains an inbuilt Ultra-Violet disinfection lamp to prevent any microbial growth inside the internal circuit components.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

All references, including publications, patent applications, and patents cited herein are hereby incorporated by reference to the same extent as if each reference were individually and specifically indicated to be incorporated by reference and were set forth in its entirety herein.

The use of the terms “a” and “an” and “the” and similar referents in the context of describing the invention (especially in the context of the following claims) is to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for simulation training of extra corporeal life support therapies, wherein the system comprises:

a mannequin with torso and head having various synthetic organs, vessels including arteries and veins, an electric circuit, and a hydraulic circuit embedded into the mannequin;

a plurality of sensors provided inside the mannequin configured for sensing pre-determined parameters during the simulation training scenarios;

an internal tank reservoir provided in the hydraulic circuit configured to act like a fluid reservoir to help in seamless air free circulation of fluid for simulation;

an external perfusion simulator connected to the internal tank reservoir configured to fill fluid into the internal tank reservoir;

a plurality of fluid pumps provided in the hydraulic circuit configured to prime the system and create pulsations during simulation of various clinical scenarios;

a plurality of electrically controlled solenoid valves connected to the internal tank reservoir configured to direct the fluid flow and create resistance to generate clinical scenarios for simulation;

a plurality of connectors to connect the internal tank reservoir to the external perfusion simulator;

wherein, a plurality of silicone mixture molds embedded on or inside the torso to perform realistic ultrasound guided vessel cannulation;

the predetermined parameters including pressure on teeth, proximity of endotracheal tube to trachea and proximity of endotracheal tube to oesophagus; and the system capable of generating realistic color change in the circulating fluid to mimic the venous and the arterial blood.

2. The system of claim 1, wherein a plurality of one way valves is provided in the system to direct the flow of the circulating fluid in one direction preventing back flow of the circulating fluid inside the hydraulic circuit.

3. The system of claim 1, wherein the color change of the circulating fluid achieved by reducing its temperature using a thermoelectric cooler (TEC) with fluid mixture using Thermo-Chromic Dye or by using Ultra-Violet Lamp with fluid mixture using Photo-Chromic Dye.

4. The system of claim 1, wherein inbuilt ultraviolet disinfection lamps (UV lamp) are placed inside the system to prevent microbial growth and contamination in the mannequin.

5. The system of claim 4, wherein a wireless devices controller switch provides electricity to the plurality of fluid pumps, plurality of electrically controlled solenoid valves, a thermoelectric cooler and UV lamp operated- and provides control to a user using a remote controller and/or smart mobile device and/or voice controls.

6. The system of claim 1, wherein the system is capable of simulating clinical scenarios of peripheral cannulation, double lumen cannulation, Trans-oesophageal echocardiography and/or Trans-thoracic Echocardiography, endo-tracheal intubation and ventilation, Intra-Aortic balloon catheter placement, different hemodynamic and/or cardiac scenarios, different lung resistance scenarios and various ECC case scenarios.

7. The system of claim 1, wherein the system is capable to simulate cardiac arrhythmias with changes in pulsations on femoral and/or carotid artery using the plurality of fluid pumps.

8. The system of claim 1, wherein the mannequin includes a rubber heart, rubber lungs with resistance-controlled flaps, a rubber oesophagus and stomach for simulating different clinical scenarios.

9. The system of claim 8, wherein the system is capable to simulate different lung failure clinical scenarios using restraints in the rubber lungs with resistance-controlled flaps obstructing the rubber lungs and regulating the resistance during ventilation based on one or more of the plurality of sensors.

10. The system of claim 9, wherein the plurality of sensors includes a teeth pressure sensor configured to sense increased pressure on teeth, a tracheal proximity sensor configured to sense the proximity of the endotracheal tube to trachea and an oesophageal proximity sensor configured to sense the proximity of the endotracheal tube to oesophagus.

11. The system of claim 10 wherein the plurality of sensors signals the alarm box to indicate alarm to a user using audio and visual during the simulation scenario of lung intubation.

* * * * *